(12) United States Patent
Benyahia et al.

(10) Patent No.: US 10,316,688 B2
(45) Date of Patent: Jun. 11, 2019

(54) TURBOMACHINE WITH COLLECTION OF A COMPRESSED AIR FLOW

(71) Applicant: SAFRAN AIRCRAFT ENGINES, Paris (FR)

(72) Inventors: Abdelkader Benyahia, Moissy Cramayel (FR); Jean-Michel Boiteux, Moissy Cramayel (FR); Maxime Delabriere, Moissy Cramayel (FR); Matthieu Fiack, Moissy Cramayel (FR); Eddy Stephane Joel Fontanel, Moissy Cramayel (FR); Alberto Martin Matos, Moissy Cramayel (FR); Helene Orsi, Moissy Cramayel (FR); Philippe Rembry, Moissy Cramayel (FR); Olivier Renon, Moissy Cramayel (FR); Giuliana Elisa Rossi, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 292 days.

(21) Appl. No.: 15/112,952

(22) PCT Filed: Jan. 20, 2015

(86) PCT No.: PCT/FR2015/050131
§ 371 (c)(1),
(2) Date: Jul. 20, 2016

(87) PCT Pub. No.: WO2015/110748
PCT Pub. Date: Jul. 30, 2015

(65) Prior Publication Data
US 2016/0341067 A1 Nov. 24, 2016

(30) Foreign Application Priority Data
Jan. 21, 2014 (FR) ..................... 14 50491

(51) Int. Cl.
*F01D 17/10* (2006.01)
*F02C 9/18* (2006.01)

(52) U.S. Cl.
CPC .............. *F01D 17/105* (2013.01); *F02C 9/18* (2013.01); *F05D 2210/31* (2013.01);
(Continued)

(58) Field of Classification Search
USPC ....................................... 415/58.7
See application file for complete search history.

(56) References Cited

U.S. PATENT DOCUMENTS 3,418,808 A * 12/1968 Rich ......................... F02C 7/18
415/79
6,185,925 B1 * 2/2001 Proctor ................... F01D 11/24
415/177

(Continued)

FOREIGN PATENT DOCUMENTS

| EP | 2 383 453 A2 | 11/2011 |
| EP | 2 383 453 A3 | 4/2014 |
| WO | 03/037715 A1 | 5/2003 |

OTHER PUBLICATIONS

International Search Report dated Apr. 29, 2015, in PCT/FR2015/050131 Filed Jan. 20, 2015.
(Continued)

*Primary Examiner* — Craig M Schneider
*Assistant Examiner* — David R Deal
(74) *Attorney, Agent, or Firm* — Oblon, McClelland, Maier & Neustadt, L.L.P.

(57) ABSTRACT

A turbomachine including an exhaust housing, including a plurality of arms, the space separating the arms defining openings in which there circulates a primary air flow of the turbomachine, at least one conduit, a) configured to collect a compressed air flow at one of the ends of same, b) the other
(Continued)

end of the conduit being connected to at least one opening of the exhaust housing, so as to insert the collected air flow into the primary air flow, the collected air flow having, when inserted into the opening, a Mach number less than or equal to 0.5.

10 Claims, 5 Drawing Sheets

(52) U.S. Cl.
CPC .... *F05D 2220/323* (2013.01); *F05D 2240/14* (2013.01); *F05D 2260/606* (2013.01); *F05D 2260/96* (2013.01)

(56) References Cited

U.S. PATENT DOCUMENTS

| | | | | |
|---|---|---|---|---|
| 7,549,282 | B2* | 6/2009 | Widenhoefer | F01D 5/145 |
| | | | | 415/117 |
| 7,811,050 | B2* | 10/2010 | Roth | F01D 17/162 |
| | | | | 415/116 |
| 8,033,358 | B2* | 10/2011 | Ivers | B64D 33/02 |
| | | | | 181/214 |
| 8,430,202 | B1 | 4/2013 | Mason et al. | |
| 2003/0080244 | A1 | 5/2003 | Dionne | |
| 2004/0060278 | A1 | 4/2004 | Dionne | |
| 2005/0235626 | A1* | 10/2005 | Hull | F02C 7/08 |
| | | | | 60/39.511 |
| 2005/0235627 | A1* | 10/2005 | Vandermolen | F02C 7/08 |
| | | | | 60/39.511 |
| 2007/0063098 | A1 | 3/2007 | Dionne | |
| 2008/0245062 | A1 | 10/2008 | Dionne | |
| 2009/0196739 | A1* | 8/2009 | Tsuchiya | F02C 7/04 |
| | | | | 415/119 |
| 2011/0185739 | A1* | 8/2011 | Bronson | F02C 7/18 |
| | | | | 60/755 |
| 2011/0265490 | A1 | 11/2011 | Klasing et al. | |
| 2012/0144843 | A1* | 6/2012 | Donovan | F01D 25/12 |
| | | | | 60/806 |
| 2013/0098055 | A1* | 4/2013 | Kupratis | F02C 7/143 |
| | | | | 60/774 |
| 2013/0336759 | A1 | 12/2013 | Christians | |

OTHER PUBLICATIONS

International Search Report and Written Opinion dated Apr. 29, 2015 in PCT/FR2015/050131 (with English translation of categories of cited documents).

French Preliminary Search Report and Written Opinion dated Oct. 16, 2014 in French application No. FR1450491 (with English translation of categories of cited documents).

* cited by examiner

TURBOMACHINE WITH COLLECTION OF A COMPRESSED AIR FLOW

FIELD OF THE INVENTION

The invention relates to a turbine engine, comprising collection of a compressed airflow coming from the compressor.

PRESENTATION OF THE PRIOR ART

A turbine engine conventionally comprises a high-pressure compressor and a low-pressure compressor.

According to the speed of operation of the turbine engine (for example idle, or full speed), the compressors have a different operation.

When the turbine engine shifts from a idle speed to a full speed, a full-speed compressed airflow must be exhausted from the compressor to avoid pumping risks. This is also the case during transitory flight phases, or during idle phases, or more generally when the pilot has to manipulate the gas control.

On some turbine engines by way of indication, this compressed airflow to be exhausted has a pressure of around 40 bars and a temperature of around 900 K.

Figure 1:
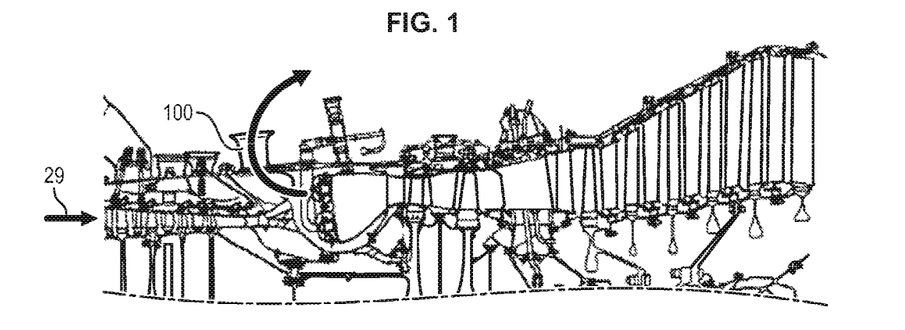
FIG. 1 is a representation of a turbine engine of the prior art.

In general, the airflow is collected at 100 downstream of the high-pressure compressor but such collection at high temperature, speed and expansion ratio generates intense noise levels and induces thermal stresses.

However, an acoustic constraint of the turbine engine means that the added noise of the aircraft caused by collection of the airflow (inherent noise of this new flow) and by its later reintroduction is less than 1 EPNdB (Effective Perceived Noise in Decibels).

Solutions of the prior art proposed for exhausting the collected airflow are not satisfactory in this respect.

According to a solution of the prior art, the collected airflow is reintroduced at the exhaust nozzle of the turbine engine. But this solution degrades the acoustics of the turbine engine. Also, it is complicated to put in place as it requires installation of additional large openings at the exhaust nozzle.

Another known solution consists of reintroducing the airflow in a secondary stream of the turbine engine. But, this involves introducing a hot airflow to the cold flow from the secondary stream, this mixture causing a strong acoustic impact.

PRESENTATION OF THE INVENTION

To eliminate the drawbacks of the prior art, the invention proposes a turbine engine characterized in that it comprises an exhaust casing, comprising a plurality of arms, the space separating the arms defining openings in which a primary airflow of the turbine engine circulates, at least one duct, configured to collect at one of its ends a compressed airflow, the other end of the duct being connected to at least one opening of the exhaust casing so as to insert the collected airflow into said primary airflow, said collected airflow having, during its insertion in the opening, a Mach number less than or equal to 0.5.

The invention is advantageously completed by the following features, taken singly or in any of their technically possible combinations:

the duct terminates at its other end in a plurality of secondary ducts, the secondary ducts being connected to the openings of the exhaust casing, to insert there the collected airflow;

the turbine engine comprises one or more diaphragms arranged in the secondary ducts and reducing the pressure of the collected airflow passing through them. In the ducts, the diaphragms conserve upstream a high-pressure flow, which therefore allows to maintain a reduced diameter of the ducts over the corresponding entire length. After it passes through the diaphragm, the flow has its pressure reduced, which contributes to a reduction in speed of the flow and respect of aerodynamic and acoustic stresses;

the diaphragms have a plurality of holes;

the turbine engine comprises one or more mouths projecting externally from the exhaust casing, the end of the secondary ducts being connected to the mouths to insert there the collected airflow towards the openings;

the turbine engine has a fillet between the mouths and the outer part of the exhaust casing;

the ends of the secondary ducts, inserting the collected airflow, are arranged to the pressure side of the arms;

the secondary ducts have a progressive incline at their end whereof the slope is of an angle θ constantly less than or equal to 45° over the entire incline relative to a longitudinal axis of the turbine engine;

the angle between the collected airflow introduced into the openings and the primary flow circulating in the turbine engine is less than 45°, preferably less than 35°;

the ends of the secondary ducts connected to the openings of the exhaust casing are arranged at an azimuthal angle comprised between 3 H and 9 H.

An advantage of the invention is to reduce the acoustic impact caused by collecting the flow and by its reintroduction.

Another advantage of the invention is to maximize the length of the ducts of the discharge system, for which the latter have a reduced diameter. The general bulk of these ducts is therefore reduced.

In particular, the invention optimizes a compromise between:

the length of the ducts for which the latter have a reduced diameter;

obtaining an airflow having a preferred Mach number at output from the ducts.

Another advantage of the invention is to propose a simple and effective solution, wherein a single piece influences both the pressure in the ducts, and therefore the length of the ducts for which a reduced diameter is obtained, as well as on the acoustic impact caused by collection of the compressed airflow.

Finally, another advantage of the invention is to propose a system having reduced bulk and which also preserves the secondary flow.

PRESENTATION OF THE FIGURES

Other features and advantages of the invention will emerge from the following description which is purely illustrative and non-limiting and must be considered with respect to the appended drawings, in which.

DETAILED DESCRIPTION

Figure 2:
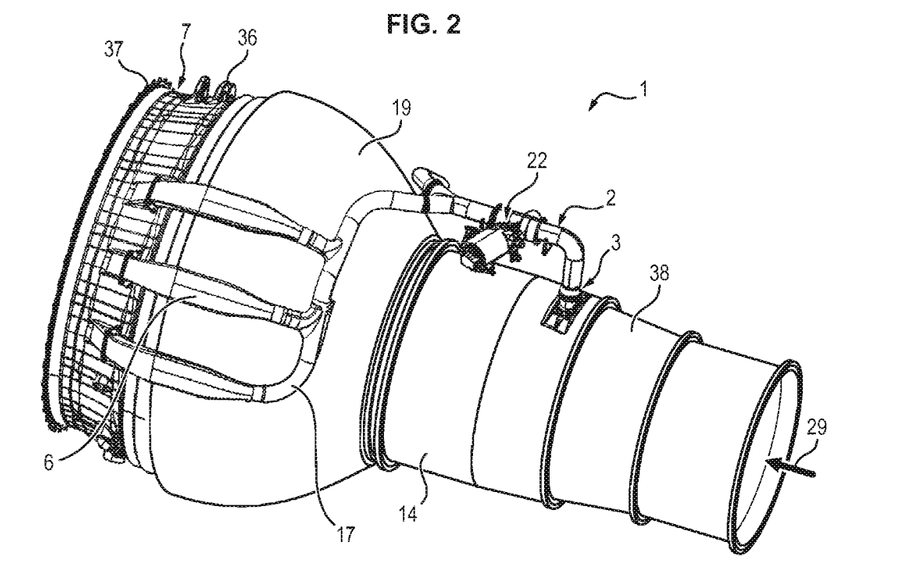
FIG. 2 is a representation of part of a turbine engine according to an embodiment of the invention.

As illustrated in FIG. 2, the turbofan engine 1 conventionally comprises a low-pressure turbine 14, a high-pressure turbine 19, and a high-pressure compressor 38. The direction of flow of the collected flow is represented by an arrow in FIG. 1.

The turbine engine 1 also comprises an exhaust casing 7, arranged at output from the low-pressure turbine 14. This exhaust casing 7 is designated by the term "Turbine Rear Frame" by the person skilled in the art, and is of revolution type. This exhaust casing 7 is classically arranged before the exhaust nozzle. It serves especially to maintain the structure of the turbine engine.

Figure 3:
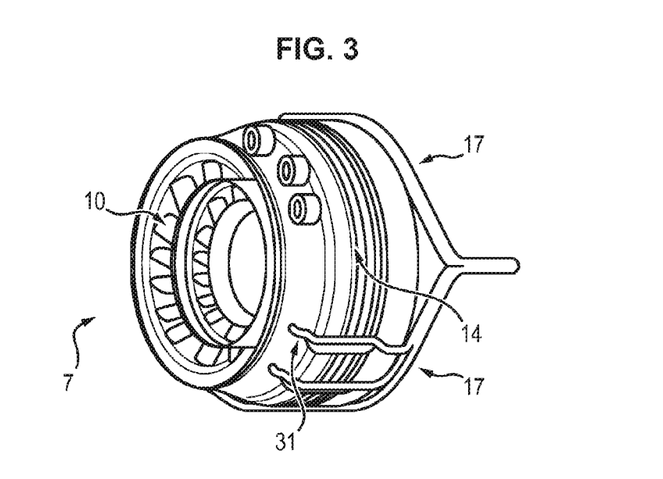
FIGS. 3 and 4 represent an exhaust casing comprising a plurality of arms (arms "TRF", in side elevation and rear view)
Figure 4:
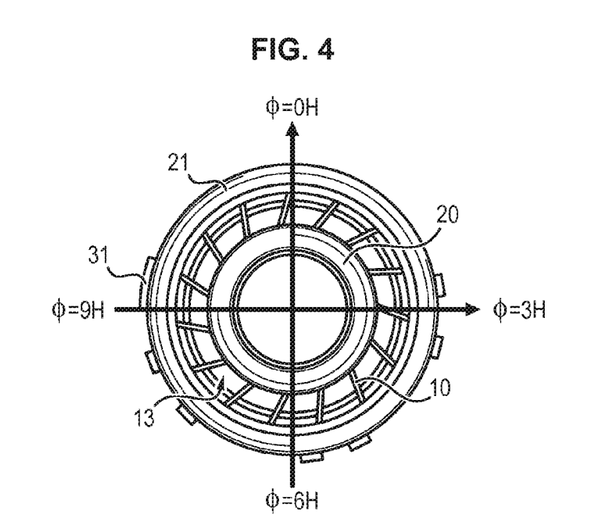

As illustrated in FIGS. 3 and 4, the exhaust casing 7 is substantially of revolution and comprises a plurality of arms 10, the space separating the arms defining openings 13.

The arms 10 extend especially between an internal hub 20 of the piece and an outer shroud 21 of the piece. The shroud 21 is for example polygonal. The hub 20 is made in a single piece and is cast.

The arms 10 extend in a radial direction, or in a tangential direction relative to the hub, or in an intermediate direction between these two directions. Their apex is cast.

Radial means the radial axis of the turbine engine 1, which extends radially relative to the longitudinal axis of the turbine engine 1 (which is the axis of flow of the primary flow 29 of the turbine engine 1). It is recalled that the primary flow is the flow which has followed the thermodynamic process in the turbine engine (especially through the combustion chamber).

The casing 7 in general comprises a plurality of sectors joined together by welding.

Suspension mounts 36 are in general provided projecting externally from the exhaust casing 7, and having one or more ears. If needed, the exhaust casing 7 comprises at least one outer flange 37, for example forged and attached.

The turbine engine 1 further comprises at least one duct 2 configured to collect at one of its ends 3 a compressed airflow. Collection can for example be carried out downstream of the high-pressure compressor 38. The other end of the duct 2 is connected to an opening 13 of the exhaust casing 7, to insert the collected airflow there. In other words, the duct 2 makes a fluid connection between the compressed collected airflow and the opening 13.

During its insertion into the opening 13, the airflow has a Mach number less than or equal to 0.5, which limits acoustic impact.

The duct 2 also comprises a valve 22 for controlling the rate of the collected airflow via the duct 2. The opening and the closing of this valve 22 are classically controlled by the aircraft calculator, as a function of the orders of the pilot. This valve 22 is classically called TBV by the person skilled in the art, for "Transient Bleed Valve".

Figure 5:
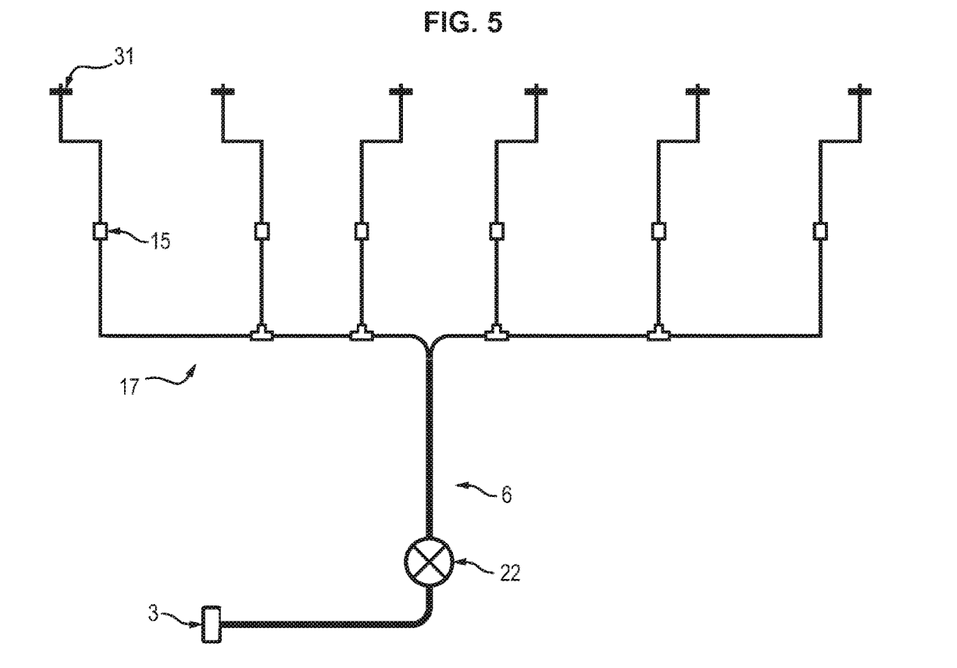
FIG. 5 is a drawing representing a duct terminating in secondary ducts comprising diaphragms, according to a possible embodiment of the invention.

In the embodiment illustrated in the figures, the duct 2 terminates at its other end by a plurality of secondary ducts 6, the secondary ducts 6 being connected to openings 13 of the exhaust casing 7 to transmit the collected airflow to them.

According to a possible embodiment, the other end of the duct 2 terminates in at least two separate branches 17 each bearing part of the secondary ducts 6. In the example, each branch 17 bears three secondary ducts 6.

According to an embodiment, the end 31 of the secondary ducts 6 passes through the outer shroud 21 of the exhaust casing 7 to pour into the openings 13 the collected airflow. For this purpose, holes can be provided in the outer shroud 21 to allow passage of the end 31 of the ducts 6.

The exhaust casing 7 typically comprises six holes distributed symmetrically: three holes on one side, and three holes on the other, so as to limit thermomechanical distortion.

Figure 10:
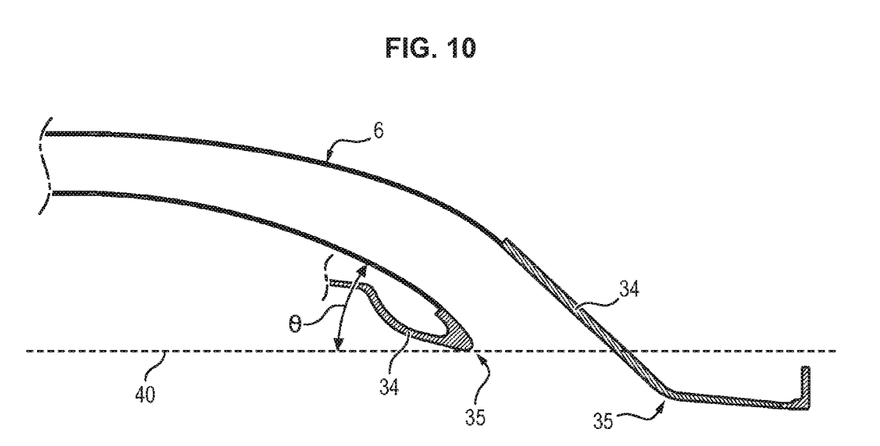
FIG. 10 represents a sectional view of the mouth projecting from the outer shroud of the exhaust casing and connected to the end of ducts.
Figure 11:
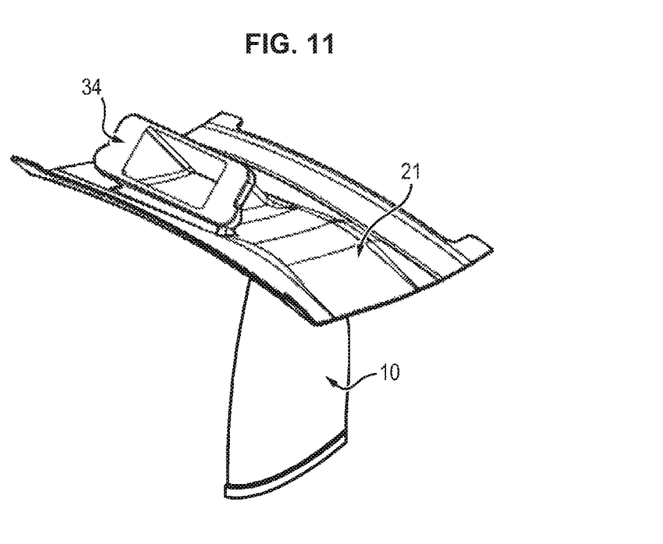
FIG. 11 represents a three-dimensional view of the mouth projecting from the outer shroud of the exhaust casing.

According to another embodiment, illustrated in FIGS. 10 and 11, the turbine engine comprises one or more mouths 34 projecting externally from the shroud 21, the end of the secondary ducts 6 being connected for example by assembly to the mouths 34 to insert the collected airflow towards the openings 13 therein.

The mouths 34 can especially be arranged on the shroud 21 between the arms 10 and preferably between welding zones.

According to a possible embodiment, fillets 35 are present between the lateral parts of the mouths 34 and the outer part (shroud 21) of the exhaust casing 7.

Also, as explained hereinbelow, it has been discovered that the fact of arranging the ends of the ducts 6 (i.e. ends which discharge the collected airflow in the casing 7) to the pressure side of the arms 10 improves aerodynamic performance.

In the embodiment implementing mouths 34, the latter are therefore advantageously arranged to the pressure side of the arms 10.

The same applies for the embodiment cited above using holes in the outer shroud 21 to allow passage of the end 31 of the ducts 6, which are advantageously arranged to the pressure side of the arms 10.

The azimuthal positioning of the ends of the ducts 6 has been defined to optimize losses of the arms 10 of the casing 7 in non-flow duct configuration.

Due to the phenomenon of lift, the Mach level at the pressure side of the arms of the casing 7 is lower relative to the Mach level at the suction side.

The presence of a duct mouth in the stream in a non-flow configuration is similar to the presence of a discontinuity, or a wall which locally stops the flow from the stream at the casing 7.

The local stop in flow causes dissipation of the energy of the flow which manifests by an increase in losses and reduction in aerodynamic performance.

The dissipation of generated power diminishes with the local Mach level of the flow, which explains the favourable properties of azimuthal positioning of the ends of the ducts 6 near the pressure side.

To improve the acoustic, and as illustrated in FIG. 10, the secondary ducts 6 have a progressive incline at their end whereof the slope is of an angle $\theta$ constantly less than or equal to 45°, relative to a longitudinal axis 40 of the turbine engine.

This smoothes the evolution of the slope of the end of the secondary ducts 6 towards the casing 7, and consequently does not have excessively abrupt breaking in the slope of the ducts. The effect of such breakage would cause solid disbonds of boundary layer, and consequently a rise in noise.

According to an embodiment, the ends 31 of the secondary ducts 6 are arranged on the low part of the exhaust casing 7, as illustrated in FIG. 4, to respect installation constraints and mechanical impact stresses on the exhaust casing 7. In fact, the top part of the exhaust casing 7 is already charged mechanically.

"Low part" means that the ends 31 of the ducts 6 are arranged at an azimuthal angle φ (angle in the plane orthogonal to the longitudinal axis of the turbine engine) of between 3 H (H for hours) and 9 H.

The collected airflow typically has pressure of around 40 bars. On leaving the valve 22 of the duct 2 the airflow typically has pressure of around 10 bars. At the openings 13 in which the collected airflow must be poured the pressure is around 1 bar.

Consequently, adaptation of the pressure of the airflow must be performed.

Figure 6:
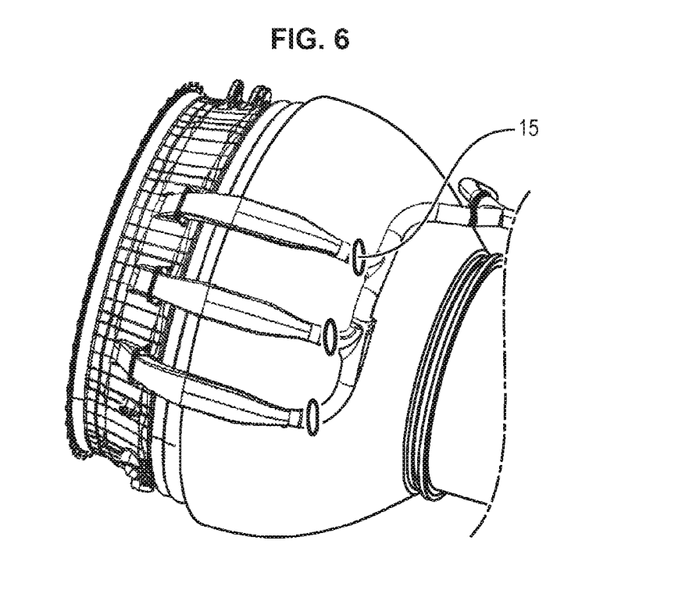
FIG. 6 illustrates possible positioning of the diaphragms.

The turbine engine 1 comprises diaphragms 15 arranged in the secondary ducts 6 and reducing the pressure of the airflow passing through them.

The position of the diaphragms 15 influences the Mach at output from the secondary ducts 6.

Figure 8:
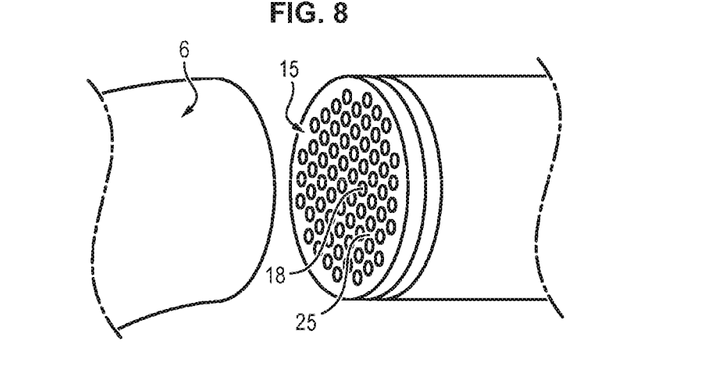
FIG. 8 represents a diaphragm having a plurality of holes.

The diaphragms 15 comprise a plate 25 having at least one hole 18.

Figure 7:
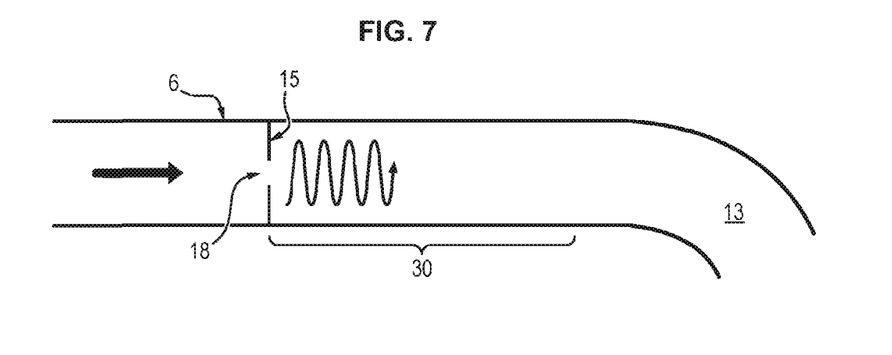
FIG. 7 represents the effect of loss of charge at output from the diaphragm on the flow of the airflow.

After it passes through the diaphragm 15, the pressure of the collected airflow is for example, though not limiting, around 1 bar.

On crossing the diaphragm 15, the loss in charge of the collected airflow causes the appearance of shock waves and a zone 30 where which the flow is supersonic.

Apart from the restriction on the Mach number less than 0.5 at output from the secondary ducts 6, it is advantageous to place ducts having reduced diameter.

For this purpose, it is preferable for the collected airflow to conserve high pressure in the ducts 2, 6 over the greatest distance possible, as this high pressure maintains a reduced diameter of the ducts 2, 6.

It is therefore preferable to be able to place the diaphragms 15 as far downstream as possible from the ducts 6 to maximize the length over which the duct 2 and the secondary ducts 6 have reduced diameter, for example of a value under 3 inches, while retaining a Mach number less than 0.5 at output from the ducts 6.

These two restrictions are contradictory, the first requiring having the diaphragms 15 as far downstream possible from the ducts 6, the second requiring the diaphragms 15 to be placed as far upstream as possible from the ducts 6.

To optimize this compromise, in an embodiment, the diaphragms 15 have a plurality of holes 18.

The use of multi-perforated diaphragms 15 in place of conventional single hole diaphragms 15 allows better mixture of the flow at output from the diaphragm and faster dissipation of shocks.

So the extent of the zone 30 downstream of the diaphragm 15 where the flow is supersonic is reduced relative to the use of a conventional diaphragm 15.

A single piece therefore responds both to mechanical (diameter of ducts) and acoustic (Mach number at output) constraints.

By way of non-limiting example, the ducts have a diameter of 2 inches downstream from the diaphragms and 2.25 inches downstream from the diaphragms.

According to an embodiment, the diaphragms 15 are arranged in the secondary ducts 6 at a position for:
  obtaining an airflow having a Mach number less than 0.5 at output from the secondary ducts 6, and
  maximizing the length over which the duct 2 and the secondary ducts 6 have a diameter of value under 3 inches.

The position of the diaphragm can be found by simulations, or via experimentations, or by a combination of the two methods.

Other constraints can be imposed on the collected flow to improve acoustic performance.

Figure 9:
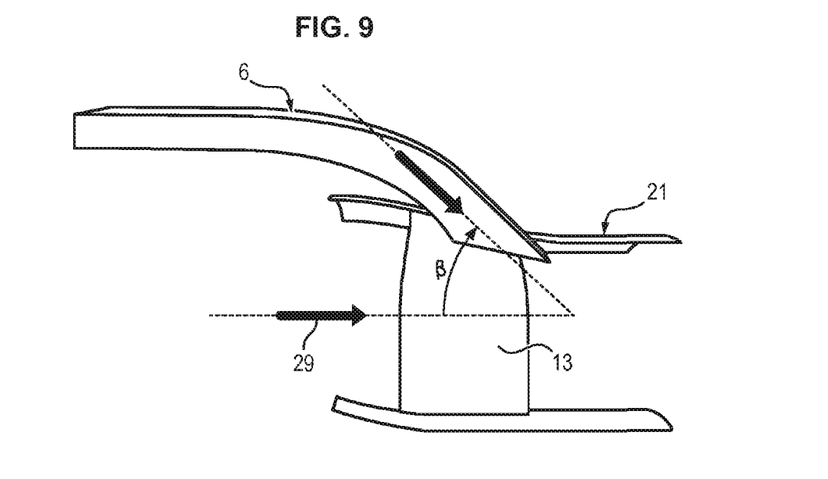
FIG. 9 represents a condition of angle for improving acoustic performance.

According to an embodiment, illustrated in FIG. 9, the ducts 6 present, at their ends 31 connected to the openings 13, an angle with the longitudinal axis of the turbine engine less than 45°. This means that the collected airflow introduced into the openings 13 has an angle β less than 45° with the primary flow 29 circulating in the openings 13 of the turbine engine. The angle β is preferably less than 35°.

In the event where mouths 34 are used, this implies that the mouths 34 are inclined relative to the shroud 21 with an angle less than or equal to 45°, or 35° according to the case.

According to a possible aspect of the invention, each secondary duct 6 is connected to a different opening 13 of the exhaust casing 7, to send it the collected airflow. Given that the openings 13 do not communicate with each other this further improves the acoustic of the flow exiting the ducts 6, given that the airflows exiting the ducts 6 do not mix.

The invention claimed is:

1. A turbine engine comprising:
   an exhaust casing comprising:
      an internal hub and an outer shroud defining together a passage for a primary airflow of the turbine engine, and
      a plurality of arms extending from the outer shroud to the internal hub, said arms dividing the passage into several openings; and
   a duct having a first end and a second end,
   wherein the duct is configured to collect at the first end thereof a compressed airflow,
   wherein the second end of the duct connected to at least one of the openings of the exhaust casing, so as to insert the compressed airflow into said primary airflow, said compressed airflow having, during the insertion in the at least one of the openings of the exhaust casing, a Mach number less than or equal to 0.5, and
   wherein the duct terminates at the second end thereof in a plurality of secondary ducts, the secondary ducts having secondary ends and being connected to the openings of the exhaust casing to insert the compressed airflow into said exhaust casing, the secondary ends of the secondary ducts passing through the outer shroud of the exhaust casing to pour into the compressed airflow into the openings of the exhaust casing, each secondary duct being connected to a different opening of the exhaust casing to send the compressed airflow within the exhaust casing.

2. The turbine engine according to claim 1, further comprising at least one diaphragm arranged in the secondary ducts and reducing the pressure of the compressed airflow passing through the secondary ducts.

3. The turbine engine according to claim 2, wherein the at least one diaphragm has a plurality of holes.

4. The turbine engine according to claim 1, further comprising mouths projecting externally from the exhaust casing, the secondary ends of the secondary ducts being connected to the mouths to insert there the compressed airflow towards the openings of the exhaust casing.

5. The turbine engine according to claim 4, having a fillet between the mouths and an outer part of the exhaust casing.

6. The turbine engine according to claim 1, wherein the ends of the secondary ducts, inserting the compressed airflow, are arranged to a pressure side of the arms.

7. The turbine engine according to claim 1, wherein the secondary ends of the secondary ducts have a progressive incline presenting a slope of an angle θ constantly less than or equal to 45° over the entire incline relative to a longitudinal axis of the turbine engine.

8. The turbine engine according to claim 1, wherein an angle between the compressed airflow introduced into the openings of the exhaust casing and the primary flow circulating in the turbine engine is less than 45° or 35°.

9. The turbine engine according to claim 1, wherein the secondary ends of the secondary ducts connected to the openings of the exhaust casing are arranged at an azimuthal angle comprised between 3H and 9H.

10. The turbine engine according to claim 1, wherein the exhaust casing includes six holes in fluid communication with the secondary ducts, the six holes being distributed symmetrically.

* * * * *